May 28, 1940.　　W. VAN B. ROBERTS　　2,202,400
DIRECTIVE SIGNALING
Filed May 6, 1937
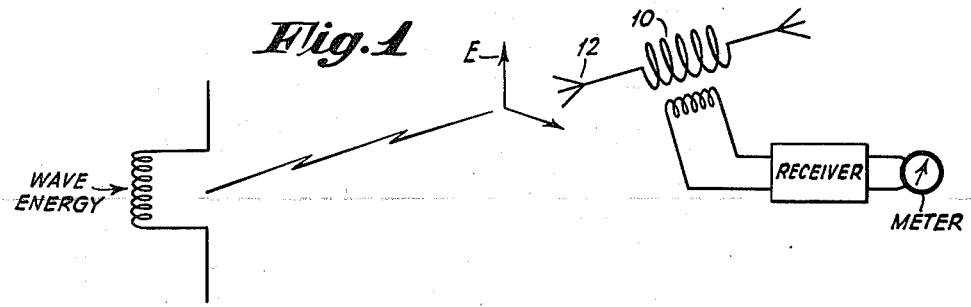
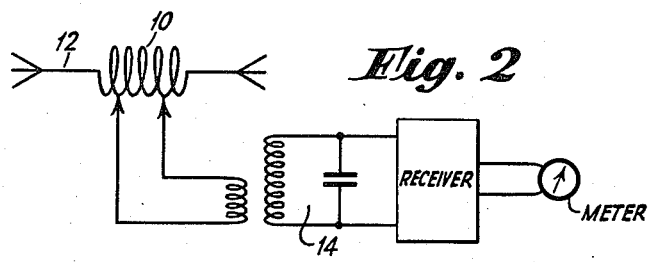
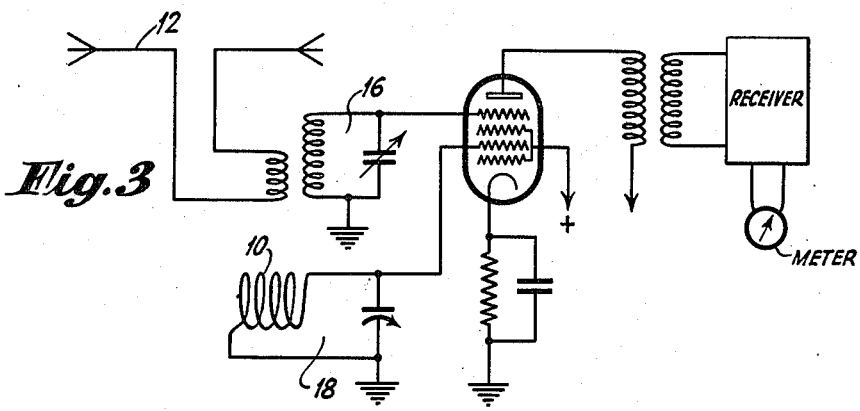
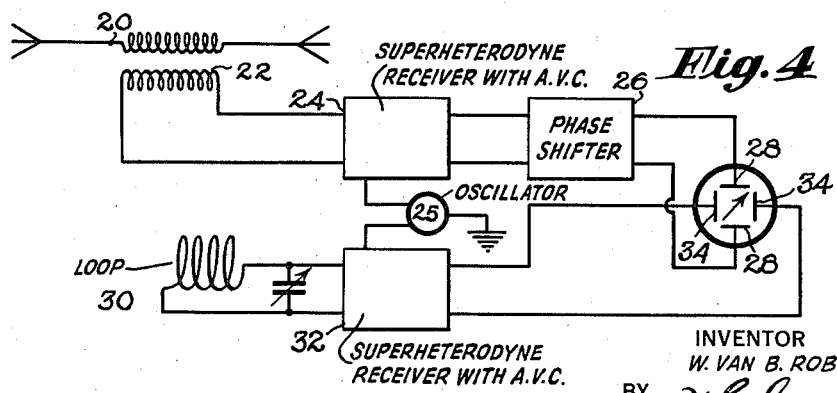
INVENTOR
W. VAN B. ROBERTS
BY
ATTORNEY Patented May 28, 1940

2,202,400

UNITED STATES PATENT OFFICE 2,202,400

DIRECTIVE SIGNALING

Walter van B. Roberts, Princeton, N. J., assignor to Radio Corporation of America, a corporation of Delaware Application May 6, 1937, Serial No. 141,024

2 Claims. (Cl. 250—11)

This application concerns a new method of and means for determining the tangent plane to a plane polarized wave front.

In my copending application Serial #141,023, filed May 6, 1937, there is described a method of direction finding employing a rotary polarized wave and a simple loop or open antenna. According to the present invention a directional receiving antenna system is disclosed that gives zero pickup of voltage from a plane polarized wave only when its axis coincides with the direction of propagation of the wave.

In describing my invention reference will be made to the attached drawing wherein;

Figure 1 illustrates schematically a source of plane polarized wave energy, an antenna system of my invention and the relation of the antenna and the wave energy field components; while Figures 2, 3, and 4 illustrate modified forms of the antenna system and receiver of the present invention.

In my novel system an antenna structure is employed that consists of two portions, one portion being a loop 10 having its axis either mounted on gimbals or fixed parallel to the line of flight of an aeroplane and the other an open antenna 12 preferably concentric with the loop and in any case having its axis parallel to the loop axis. Figures 1 and 2 show such an antenna where the lengths of the open portions are so chosen that assuming vertical polarization the pickup of the open portion for a given vertical deviation of the antenna axes from the line of propagation is the same as the pickup of the loop portion for a horizontal deviation of the same amount. The entire loop system may be so dimensioned as to the loop and open portions and the end capacities of the open portions that the system is resonant to the desired signal frequency or the system may be tuned by a variable condenser or coupled to an auxiliary tuned circuit 14 as shown in Figure 2 in the drawing. In any case the total voltage picked up will be zero only when the axes of the component portions of the antenna coincide with the direction of wave propagation while in case the axes deviate from this direction the total voltage picked up will be proportional to the sine of the angle of deviation and will differ in phase only in accordance with the direction of this deviation. This will be apparent to one skilled in the art because only when the axis of 12 and 10 coincides with the direction of the wave travel will the electrical field of the wave indicated by vector E in Figure 1 be ineffective to produce a voltage in 12 and the magnetic field indicated by vector H be ineffective to produce a voltage in 10. Thus if the pilot wishes to fly directly toward a ground station as in the case of blind landing he needs only to steer the plane so that its direction of flight coincides with the axis of the antenna system when the latter is in the position of zero pickup.

In a modification of the invention the loop and open antenna portions may deliver their voltages separately to the receiver. In Figure 3 this is accomplished by applying the voltage derived from the open portion to one grid of a dual control grid type of vacuum tube while the loop voltage is applied to the other control grid. The axes of the two antenna portions are fixed parallel to each other and if not arranged concentrically at least the two portions are arranged to be not more than a small fraction of a wave length different in their respective distances from the ground station so as to avoid any appreciable shift in their relative voltage phases. In Figure 3 it is not necessary to construct the two antennae for equal pickup at equal vertical and horizontal angles of deviation as the coupling between the open antenna and its associated tuned circuit may be adjusted to equalize the effects of the two antenna voltages upon the plate current of the tube. In this case separate tuning means 16 and 18 may be used.

In the modification shown in Figure 4 a plane polarized wave from any source is again used to take bearings on. The system of Figure 4 comprises a linear aerial 20 which may be of the dipole type, coupled by a tuned circuit 22 to a superheterodyne receiver 24 having automatic volume control features. The output of superheterodyne receiver 24 is connected by means of a phase shifter 26 the purpose of which will be described later, to a pair of plates 28 of a cathode ray tube. A loop aerial 30 is connected to the input of a second heterodyne receiver 32 having automatic volume control features and being coupled at its output to the plates 34 of the cathode ray tube. The vertical aerial 20 is mounted preferably along the axis of the plane while the loop aerial 30 is mounted with its plane at right angles to the line the plane normally follows. In operation the voltages picked up by the loop aerial 30 and vertical aerial 20 are reduced by heterodyne receivers 32 and 24 and common local oscillator 25 to intermediate frequency wave energy on voltages which is impressed on the plates of the cathode ray tube. When no energy is picked up by either aerial the cathode ray will fall on the center of the target. Under these conditions it may be assumed that the ship is moving exactly toward the station sending out the plane polarized wave. If the ship deviates upwards the vertical aerial 20 picks up voltage which acts through the receiver 24 and phase shifter 26 to influence the path of the ray in a vertical direction so that it makes a vertical trace on the cathode ray tube target. The same effect happens when the plane's path is downward so that the vertical aerial again picks up voltage. When the ship deviates both upwards and sideways, that is, in a horizontal plane, voltage is picked up by the loop and by the vertical. These voltages, acting through the receivers 24 and 32, are set up across both pairs of plates and the trace inclines at an angle which is determined by the ratio of the angles of deviation of the plane in the horizontal and in the vertical and hence indicates clock position of the axis of the plane with respect to the line between the plane and the transmitter. During normal operation, the pilot of the plane so steers the same that there is no horizontal deviation but there is a vertical deviation as the pilot is flying in a horizontal plane at some wave height above ground indicated by his barometer. When he passes the field boundary the ship or the transmitter station is located, which boundary is indicated by local markers. He turns the nose of the plane down until the vertical deviation is zero and then holds the spot or the cathode ray on the center of the target until he reaches ground. As a check he may read the angle of descent on other instruments.

The line of direction is indicated, as given above, and sense of direction may be determined by orienting the plane and noting the direction which the cathode ray deviates. The phase shifting means 26 may be of any nature such as for example, as illustrated in my United States application #69,105 filed March 6, 1936, or of a more simplified type. The purpose of the phase shifting means 26 is to permit proper polarity and phase relation between the voltages on the plates 20 and 34 to obtain correct indications of the plane's deviation from its correct path. If it deviates in the wrong direction then the pilot will note that he is flying away from the transmitter station instead of towards it. It will be understood that in addition to being given suitable polarity to make the angle of inclination of the oscilloscope trace correspond to the sense of deviation in a desired fashion, the relative phase of the voltages on the plates is preferably adjusted to produce a linear trace, that is, the phase difference is preferably either zero or 180°.

I claim:

1. In a directional receiving system, a linear absorption member responsive only to wave energy when a line through its length deviates from the line of direction of propagation of said wave energy, a second member arranged in a plane perpendicular to said linear member and responsive only to voltage in said wave energy when its plane deviates from a position at right angles to the line of direction of said propagated wave energy, a cathode ray tube including a target and pairs of deflecting plates and amplifying means coupling for applying high frequency energy from each of said members to a different pair of deflecting plates, a phase shifting means between one of said amplifying means and the deflecting plates associated therewith, said last means being so adjusted that the energy applied to each of said pairs of plates is in phase whereby a linear indication is obtained.

2. A directional receiving system for aircraft comprising a linear antenna disposed longitudinally of said craft and responsive only to wave energy when a line through the length deviates from the line of direction of propagation of said wave energy, a loop antenna disposed in a plane transverse to said craft and responsive only to wave energy when its plane deviates from a position at right angles to the line of propagation of said wave energy, a cathode ray tube including a target and pairs of deflecting plates, means including amplifiers for applying high frequency energy picked up by each of said antennas to a different pair of deflecting plates and phase shifting means between one of said amplifying means and the deflecting plates associated therewith, said last means being so adjusted that the energy applied to each of said pairs of plates is in phase whereby a linear indication is always obtained.

WALTER van B. ROBERTS.